April 25, 1939.  R. P. LANSING  2,155,974
DRIVING MECHANISM
Original Filed May 12, 1930
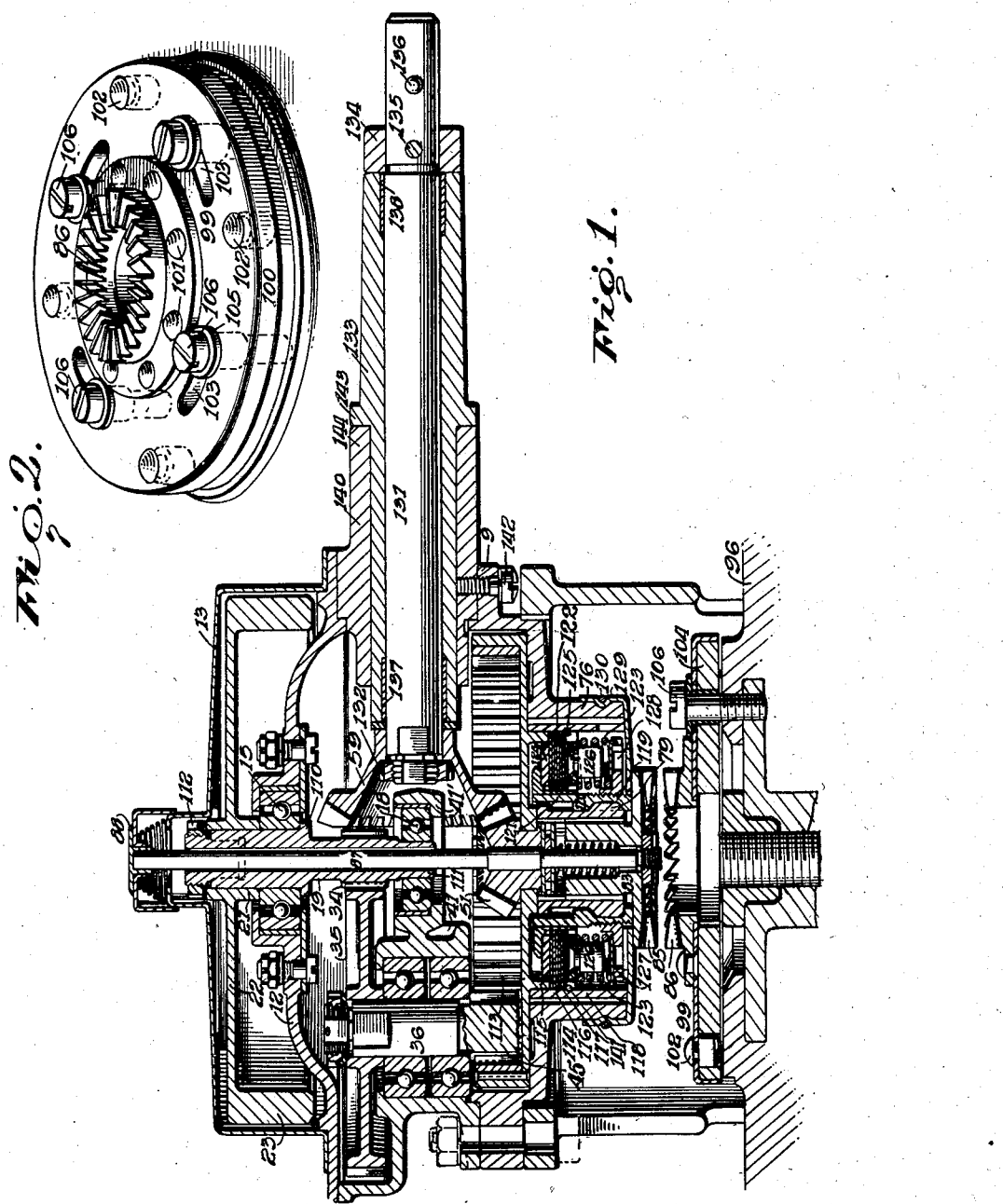
INVENTOR.
Raymond P. Lansing
BY
ATTORNEY.

Patented Apr. 25, 1939

2,155,974

UNITED STATES PATENT OFFICE 2,155,974

DRIVING MECHANISM

Raymond P. Lansing, Montclair, N. J., assignor to Eclipse Aviation Corporation, East Orange, N. J., a corporation of New Jersey Original application May 12, 1930, Serial No. 451,830. Divided and this application December 1, 1936, Serial No. 113,738

2 Claims. (Cl. 64—13)

This invention relates to driving mechanism, and particularly to a driving mechanism having resilient coupling elements for shock absorption.

The object is to provide an improved mechanism of the character indicated.

In the drawing:

Fig. 1 is a longitudinal sectional view of a device embodying the invention; and Fig. 2 is a perspective view of the resilient coupling elements.

In the embodiment shown a hollow shaft 19 is rotatably mounted in bearings 15 and 18, the latter being retained in an extension 41' of web 41. The hollow shaft 19 is provided with a shoulder 110 for engaging the inner part of the bearing 15 and a tapered end 111 to fit a corresponding tapered inner part of the bearing 18 for providing a rigid connection of the shaft with the inner rotating part of the bearing and for maintaining the bearing seated in the apertures of the diaphragm 12 and web. The hub 21 of the inertia member 22 rests directly on the inner part of the bearing 15 and is held in rigid contact with the same by means of a nut 112 threaded on the threaded end of shaft 19. A cover plate 13 extends over the relatively massive rim portion 23 of flywheel 22, and registers with a circular flange on the diaphragm 12, in which bearing 15 is received.

An internal ring gear 113 meshes with the pinion gear 45 formed integral with the stub shaft 36. This internal gear 113 is rigidly mounted in a member 114 having a part 115 to which is attached an extension 116 by any suitable means such as a sweated joint. The part 115 at its lower end is cut away to form splines 117. A bushing 118 is provided to form a bearing surface for the extension 116. A hollow cylindrical member 119 with internal long lead threads 120 for engagement with nut 79 and external ribs 121 forming splines, is positioned within the extension 116. A series of friction discs 122 are provided for connecting the extension 116 to the hollow cylindrical member 119 and adapted to transmit a predetermined torque only. These friction discs are of two sets in alternate relation and the discs of one set are connected with the spline 117 of extension 116, while the discs of the other set, disposed alternately with the discs of the first set, are connected to the cylindrical member 119 by splines 121. The frictional engagement between the sets of discs may be adjusted to any desired amount by means of springs 123. The friction discs 122 are held in position by means of rings 124 seated on an extension of the spline 121 and a ring 125 held in position by a series of springs 123. These springs are centered by means of depending lugs 126 from the ring 125. The other ends of the springs 123 are seated on an adjustable ring 127 having a screw threaded engagement with the member 119 and are provided with a series of apertures 128 for engagement by a spanner wrench. By advancing or retracting the ring 127 the compression of the springs 123 may be adjusted for varying the frictional engagement of the alternate discs 122. The hollow cylindrical member and disc clutch assembly is retained in position by means of a snap ring 141. A detachable dust cover 129 is provided having a slotted resilient skirt with a protruding rib adapted to engage a cooperating recess in the casing extension 76. A snap ring 130 insures positive engagement of the cover with the extension.

The manually operated actuating means for the reduction gearing comprises the bevel gear 59 held in its proper longitudinal position on the shaft 131 by means of a nut 132 on the threaded extension of the shaft. A sleeve 133 abuts against the other side of the hub of gear 59. This sleeve surrounds the shaft 131 and is held in position by means of collar 134 fastened to the shaft by means of a set screw 135. A pin 136 extends transversely of the shaft 131 for engagement by a removable crank (not shown). Bushings 137 and 138 are positioned at each end internally of the sleeve for supporting the shaft 131 and correcting any slight inaccuracies in the respective diameter. A sleeve 140 is provided in an aperture of the casing part 9 for rotatably supporting the sleeve 133 and is held in its position in the casing by means of a set screw 142. The assembly of shaft, gear, and sleeve is adapted for longitudinal movement in the journal 140 to demesh the gears 59 and 51. To limit the longitudinal movement when the gears are in mesh a shoulder 143 is provided on the sleeve which abuts against a shoulder 144 formed on the outside end of the journal 140.

Driven clutch member 86 is secured to a plate 99 (Fig. 2) having a peripheral flange 100 by any suitable means such as rivets 101. Also mounted on the opposite side of the plate are angularly disposed studs 102 each of which is held in position by a head peened over on the front side of the plate. Also angularly disposed on the plate 99, but on different diameters from the studs 102, are slots 103 concentric with the axis of rotation. Positioned in the under side of the plate 99 and within the flange 100, is a disc of resilient material 104, such as rubber, having apertures for receiving studs 102 and apertures in alignment with the slots 103 at one end. Bushings 105 are inserted in these apertures for receiving cap screws 106 which extend through the plate 99 and resilient disc 104, and are adapted to be screwed into tapped holes in the flywheel 96. With this arrangement the rotation of the jaw clutch teeth 86 is transmitted to the flywheel 96 through the resilient disc 104 by means of the studs 102 and cap screws 106, preventing any shocks from being transmitted to the engine. The operator attaches a hand crank to the shaft 131 by means of the pin 136 and slides the shaft and sleeve 133 until the shoulder 143 abuts with the shoulder 144 at which time the gear 59 and pinion 51 will be in mesh. The shaft is then rotated by the crank which motion is transmitted through the gears 113, 45, 35, and 34 integral with the hollow shaft 19 and the inertia member rigidly attached thereto. After sufficient energy has been stored in the inertia member to start the engine, the cranking shaft 131 is moved longitudinally out of engagement with the actuating mechanism. The push-button 88 is depressed to move rod 87 axially and thereby cause teeth 85 of driving member 83 to move into engagement with the driven clutch member 86 of the engine to be started. The motion of the inertia member is then transmitted back through the shaft 19, gears 34, 35, 45, 113 to the cylindrical extension 116. The friction discs 122 will then transmit a predetermined torque to the member 119. Rotation of the member 119 advances the nut 79 and firmly holds the driving member 83 in engagement with the driven member. If the resistance of the engine is greater than the torque which can be transmitted through the friction discs 122, a relative slippage will occur preventing excessive strains or breakage of parts. When the engine starts to run under its own power the nut 79 will be retracted and the spring 92 will disengage the driving member from the driven member of the engine.

Thus it will be seen that a compact, efficient starting mechanism has been provided which prevents undue strains from being imposed upon the parts, allowing the parts to be made in a light compact form, and also providing a starter in which any sudden shocks in starting are prevented from being directly applied to the crank shaft of the engine.

It will be obvious that the invention is not limited to the specific forms described and illustrated in the drawing, but is capable of a variety of mechanical embodiments. Various other changes which will now appear to those skilled in the art may be made in the form, details of construction, and arrangement of parts without departing from the spirit of the invention, and reference is therefore to be had to the appended claims for a definition of the limits of the invention.

This application is a division of my copending application Serial No. 451,830 filed May 12, 1930.

What is claimed is:

1. In an apparatus of the class described, an engine flywheel having protruding studs, spaced apart and equi-distant from its axis of rotation, a plate having a clutch jaw on one side, circular slotted apertures in the plate, said apertures having an angular spacing corresponding to that of the protruding studs of the flywheel, depending studs on said plate equi-distant from the axis of rotation but at a greater distance from the axis than are the studs of the flywheel, and a resilient driving connection between the plate member and the engine flywheel comprising a yielding disc having apertures for receiving the protruding studs of the engine flywheel and the depending studs of the plate.

2. In an apparatus of the class described, a rotatable part having protruding studs, spaced apart and equi-distant from its axis of rotation, a driving plate provided with circular slotted apertures having an angular spacing corresponding to that of the protruding studs, and also provided with depending studs equi-distant from the axis of rotation but at a greater distance from the axis than the first named studs, and a resilient driving connection between the driving plate and the rotatable part, said driving connection comprising a yielding disc having apertures for receiving the protruding studs of the rotatable part and the depending studs of the driving plate.

RAYMOND P. LANSING.